US010963016B1

(12) United States Patent
Oh et al.

(10) Patent No.: US 10,963,016 B1
(45) Date of Patent: Mar. 30, 2021

(54) ELECTRONIC APPARATUS FOR PROVIDING CONTENT AND CONTROL METHOD THEREOF

(71) Applicant: LG ELECTRONICS INC., Seoul (KR)

(72) Inventors: Seungkeun Oh, Seoul (KR); Sungsu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/751,190

(22) Filed: Jan. 23, 2020

(30) Foreign Application Priority Data

Dec. 3, 2019 (WO) ................ PCT/KR2019/016890

(51) Int. Cl.
| | |
|---|---|
| G06F 1/16 | (2006.01) |
| G09F 9/30 | (2006.01) |
| G06F 3/0487 | (2013.01) |
| G06F 3/041 | (2006.01) |
| G06F 3/0489 | (2013.01) |
| G06F 3/0488 | (2013.01) |

(52) U.S. Cl.
CPC .......... G06F 1/1675 (2013.01); G06F 1/1626 (2013.01); G06F 1/1652 (2013.01); G06F 3/0416 (2013.01); G06F 3/0487 (2013.01); G06F 3/04883 (2013.01); G06F 3/04886 (2013.01); G06F 3/04897 (2013.01); G09F 9/301 (2013.01)

(58) Field of Classification Search
CPC ....... G06F 1/1675; G06F 1/1652; G09F 9/301
See application file for complete search history.

(56) References Cited

U.S. PATENT DOCUMENTS 6,248,049 B1 * 6/2001 Scheggetman ........ B42D 15/08
493/188
6,268,857 B1 * 7/2001 Fishkin ..................... G06F 1/16
345/156

(Continued)

FOREIGN PATENT DOCUMENTS

CN 103941816 A * 7/2014
KR 1020140062280 5/2014

(Continued)

OTHER PUBLICATIONS

PCT International Application No. PCT/KR2019/016890, International Search Report dated Aug. 24, 2020, 4 pages.

*Primary Examiner* — Ryan Barrett
(74) *Attorney, Agent, or Firm* — Lee, Hong, Degerman, Kang & Waimey

(57) ABSTRACT

Disclosed is an electronic apparatus including a flexible display of which at least a portion is located at a first side of the electronic apparatus and a size of the flexible display exposed at the first side is changed, and a controller, wherein the controller is configured to provide first content in a first area of the flexible display exposed on the first side and provide at least a portion of second content in a second area of the flexible display exposed on the first side based on information on the size in response to the size being changed, a size of the first area corresponds to a predetermined size, and a size of the second area corresponds to a change in the size of the flexible display exposed at the first side.

20 Claims, 19 Drawing Sheets

(56) References Cited

U.S. PATENT DOCUMENTS

| | | | | |
|---|---|---|---|---|
| 8,654,095 B1* | 2/2014 | Cho | G06F 3/0412 | 345/173 |
| 9,164,547 B1* | 10/2015 | Kwon | G06F 1/1656 | |
| 9,262,059 B2* | 2/2016 | Kim | G06F 3/0484 | |
| 9,318,070 B2* | 4/2016 | Park | G09G 5/00 | |
| 10,133,373 B2* | 11/2018 | Kim | G06F 3/041 | |
| 10,194,543 B2* | 1/2019 | Seo | G06F 1/1652 | |
| 2003/0076343 A1* | 4/2003 | Fishkin | G06F 1/16 | 715/701 |
| 2008/0303782 A1* | 12/2008 | Grant | G06F 1/1652 | 345/156 |
| 2009/0051830 A1 | 2/2009 | Matsushita et al. | | |
| 2010/0088634 A1* | 4/2010 | Tsuruta | G09G 5/14 | 715/800 |
| 2010/0117975 A1* | 5/2010 | Cho | G06F 3/0416 | 345/173 |
| 2010/0289730 A1* | 11/2010 | Aoki | H04M 1/0268 | 345/76 |
| 2010/0298033 A1* | 11/2010 | Lee | G06F 1/1692 | 455/566 |
| 2011/0134145 A1* | 6/2011 | Moriwaki | G09G 3/3208 | 345/660 |
| 2011/0177840 A1* | 7/2011 | Huang | G06F 1/1641 | 455/556.1 |
| 2011/0187681 A1* | 8/2011 | Kim | G06F 1/1652 | 345/204 |
| 2011/0216064 A1* | 9/2011 | Dahl | G06F 1/1677 | 345/428 |
| 2012/0033354 A1* | 2/2012 | Huang | G09F 9/301 | 361/679.01 |
| 2012/0162876 A1* | 6/2012 | Kim | H04M 1/0237 | 361/679.01 |
| 2012/0194448 A1* | 8/2012 | Rothkopf | G06F 3/0482 | 345/173 |
| 2012/0307472 A1* | 12/2012 | Bohn | G06F 1/1652 | 361/807 |
| 2013/0050270 A1* | 2/2013 | Joo | G06F 1/1652 | 345/661 |
| 2013/0127917 A1* | 5/2013 | Kwack | G06F 1/1652 | 345/660 |
| 2013/0127918 A1* | 5/2013 | Kang | G06F 1/1652 | 345/660 |
| 2013/0201101 A1* | 8/2013 | Niu | G06F 3/1423 | 345/156 |
| 2013/0227419 A1* | 8/2013 | Lee | G06F 3/04883 | 715/728 |
| 2013/0252668 A1* | 9/2013 | Cheng | G06F 1/1647 | 455/556.1 |
| 2013/0265221 A1* | 10/2013 | Lee | H04N 21/43615 | 345/156 |
| 2013/0300686 A1* | 11/2013 | Yoon | G06F 3/04842 | 345/173 |
| 2013/0328917 A1* | 12/2013 | Zambetti | G06F 1/1626 | 345/620 |
| 2014/0033117 A1* | 1/2014 | Kim | G06F 3/0481 | 715/796 |
| 2014/0049464 A1* | 2/2014 | Kwak | G06F 3/017 | 345/156 |
| 2014/0111417 A1* | 4/2014 | Son | G06F 3/03 | 345/156 |
| 2014/0118317 A1* | 5/2014 | Song | G06F 1/3265 | 345/204 |
| 2014/0132626 A1* | 5/2014 | Shih | G09G 5/34 | 345/629 |
| 2014/0137041 A1* | 5/2014 | Jeon | G06F 1/1652 | 715/815 |
| 2014/0152541 A1* | 6/2014 | Murarka | G06F 3/0481 | 345/156 |
| 2014/0176421 A1* | 6/2014 | Chen | G09G 3/20 | 345/156 |
| 2014/0210706 A1* | 7/2014 | Park | G06F 1/1652 | 345/156 |
| 2014/0285450 A1* | 9/2014 | Cho | G06F 1/1647 | 345/173 |
| 2014/0285618 A1* | 9/2014 | Cho | H04N 5/23238 | 348/38 |
| 2014/0333545 A1* | 11/2014 | Lee | G06F 3/04883 | 345/173 |
| 2014/0340338 A1* | 11/2014 | Kim | G06F 3/0488 | 345/173 |
| 2014/0380186 A1* | 12/2014 | Kim | G06F 1/1652 | 715/746 |
| 2015/0022436 A1* | 1/2015 | Cho | H04M 1/0245 | 345/156 |
| 2015/0022445 A1* | 1/2015 | Moriwaki | G09G 3/3208 | 345/156 |
| 2015/0220119 A1* | 8/2015 | Seo | G09F 9/301 | 345/173 |
| 2015/0378557 A1* | 12/2015 | Jeong | G06F 21/32 | 715/835 |
| 2016/0054758 A1* | 2/2016 | Han | G06F 1/1652 | 361/679.26 |
| 2016/0057356 A1* | 2/2016 | Nagano | H04M 1/0268 | 348/333.06 |
| 2016/0085319 A1* | 3/2016 | Kim | H04M 1/0268 | 345/156 |
| 2016/0085325 A1* | 3/2016 | Lee | G06F 1/169 | 345/173 |
| 2016/0112667 A1* | 4/2016 | Park | H04N 21/4886 | 348/739 |
| 2016/0306534 A1* | 10/2016 | Woo | G09G 5/373 | |
| 2017/0045996 A1* | 2/2017 | Ka | G06F 1/1694 | |
| 2017/0091340 A1* | 3/2017 | Yoon | G09G 3/20 | |
| 2018/0059717 A1* | 3/2018 | Kim | G06F 3/1438 | |
| 2019/0121397 A1* | 4/2019 | Kang | G06F 1/1652 | |
| 2019/0235577 A1* | 8/2019 | Wang | G06F 1/1652 | |
| 2019/0384438 A1* | 12/2019 | Park | G06F 1/1652 | |
| 2020/0020255 A1* | 1/2020 | Yoon | G06F 1/1652 | |
| 2020/0034012 A1* | 1/2020 | Kang | H04M 1/0214 | |

FOREIGN PATENT DOCUMENTS

| | | | |
|---|---|---|---|
| KR | 1020170043374 | | 4/2017 |
| KR | 1784880 B1 | * | 10/2017 |
| KR | 101871716 | | 6/2018 |
| KR | 101943435 | | 1/2019 |
| KR | 102014791 | | 10/2019 |
| WO | WO 2016/186258 A1 | * | 11/2016 |

* cited by examiner

US 10,963,016 B1

ELECTRONIC APPARATUS FOR PROVIDING CONTENT AND CONTROL METHOD THEREOF

CROSS-REFERENCE TO RELATED APPLICATION

Pursuant to 35 U.S.C. § 119, this application claims the benefit of an earlier filing date and right of priority to International Application No. PCT/KR2019/016890, filed on Dec. 3, 2019, the content of which is hereby incorporated by reference herein in its entirety.

BACKGROUND

1. Field

This disclosure relates to an electronic apparatus for providing content based on information on a size of a display and a control method thereof.

2. Description of the Related Art

Advances of network technologies and expansions of infrastructures have enabled an electronic device to perform various and professional tasks. In this regard, there has been an increasing desire for an electronic device with a display that displays content on a large screen.

However, a display providing a large screen may increase in size in proportional to a size of a screen. Thus, it is necessary to consider a portability along with a size of the display in terms of an electronic device of which the portability is emphasized, such as a mobile terminal.

For this, it can be considered a method to change a size of a display as necessary by applying a flexible display to the electronic device.

In terms of the display having a variable exposure size, content may be changed based on the size of the display. Accordingly, there is a desire for a technology to effectively provide content based on a size of a display.

SUMMARY

An aspect provides an electronic apparatus for providing content with increased ease and efficiency by reflecting a size of a display, and a control method of the electronic apparatus.

Technical goals of the present disclosure are not limited as mentioned above and, although not mentioned, may include goals that can be clearly understood by those skilled in the art to which the present disclosure pertains, from the following description.

According to an aspect, there is provided an electronic apparatus including a flexible display of which at least a portion is located at a first side of the electronic apparatus and a size of the flexible display exposed at the first side is changed, and a controller, wherein the controller is configured to provide first content in a first area of the flexible display exposed on the first side and provide at least a portion of second content in a second area of the flexible display exposed on the first side based on information on the size in response to the size being changed, a size of the first area corresponds to a predetermined size, and a size of the second area corresponds to a change in the size of the flexible display exposed at the first side.

According to another aspect, there is also provided a control method of an electronic apparatus. The electronic apparatus includes a flexible display of which at least a portion is located at a first side of the electronic apparatus and a size of the flexible display exposed at the first side is changed. The control method includes identifying information on the size in response to the size being changed, and providing first content in a first area of the flexible display exposed on the first side and providing at least a portion of second content in a second area of the flexible display exposed on the first side, based on the identified information. A size of the first area corresponds to a predetermined size. A size of the second area corresponds to a change of the size of the flexible display exposed at the first side.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
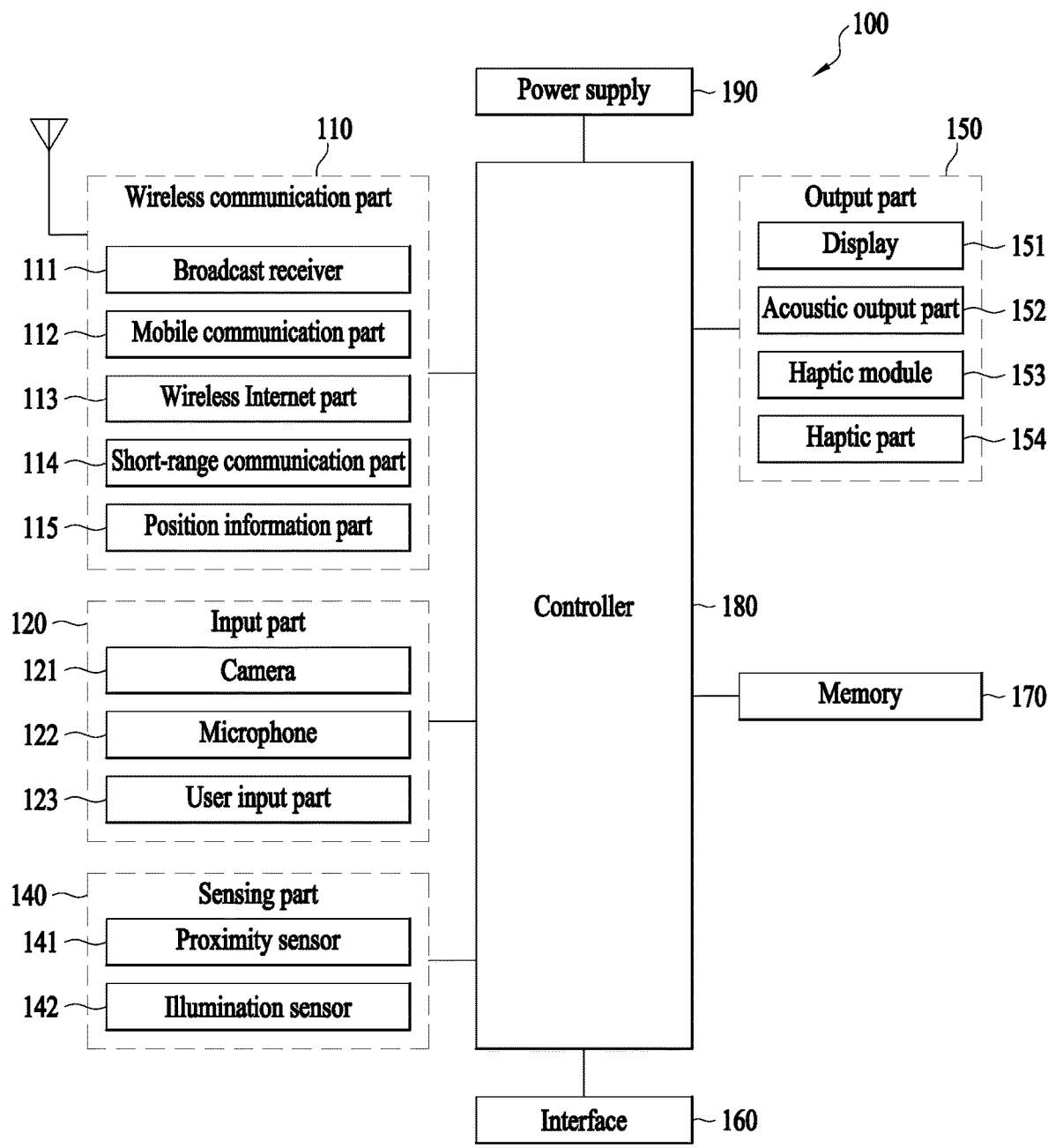
FIG. 1 is a block diagram illustrating an electronic apparatus related to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure.

An electronic apparatus 100 may include a wireless communication part 110, an input part 120, a sensing part 140, an outer part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communication part 110 may include at least one module that enables wireless communication to be performed between the electronic apparatus 100 and a wireless communication system, between the electronic apparatus 100 and another electronic apparatus 100, or between the electronic apparatus 100 and an external server. The wireless communication part 110 may include one or more modules that connect the electronic apparatus 100 to one or more networks.

The wireless communication part 110 may include at least one of a broadcast receiver 111, a mobile communication part 112, a wireless Internet part 113, a short-range communication part 114, and a position information part 115.

Referring to the wireless communication part 110, the broadcast receiver 111 of the wireless communication part 110 may receive a broadcast signal and/or broadcast related information from an external broadcast management server through a broadcast channel. The broadcast channel may include a satellite channel and a terrestrial channel. Two or more broadcast receivers may be provided to the mobile terminal 100 for simultaneous broadcast reception or broadcast channel switching for at least two broadcast channels.

The mobile communication part 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal may include various types of data based on transmission and reception of a voice call signal, a video call signal, or a text/multimedia message.

The wireless Internet part 113 may refer to a module for wireless Internet access, and may be embedded or disposed external to the electronic apparatus 100. The wireless Internet part 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet part 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communication part 112.

The short-range communication part 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication part 114 may use wireless area networks to support wireless communication between the electronic apparatus 100 and a wireless communication system, wireless communication between the electronic apparatus 100 and another electronic apparatus 100, or wireless communication between the electronic apparatus 100 and a network in which another mobile terminal (100 or external server). The wireless range networks may be wireless personal area networks.

The position information part 115 may be a module that acquires a position (or current position) of a mobile terminal. A representative example of the position information part 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the position information part 115 may perform a certain function of other modules of the wireless communication part 110 to acquire data on the position of the mobile terminal, additionally or in substitution. The position information part 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The camera 121 may process an image frame such as a stationary image or a moving image acquired by an image sensor in a video call mode or a capturing mode. The processed image frame may be displayed on the display 151 or stored in the memory 170. For example, the electronic apparatus 100 may include a plurality of cameras 121. In this example, the cameras 121 may be arranged in a matrix structure. Through the cameras 121 arranged in the matrix structure, a plurality of pieces of image information having various angles and focal points may be input to the electronic apparatus 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the electronic apparatus 100. In the microphone 122, various noise removal algorithms may be implemented to remove noise generated in a process of receiving external acoustic signals.

The user input part 123 may be to receive information from a user. When the information is input through the user input part 123, the controller 180 may control an operation of the electronic apparatus 100 based on the input information. The user input part 123 may include a mechanical input means (or a mechanical key, for example, a button a dome switch, a jog wheel, and a jog switch on a front, rear, or side surface of the electronic apparatus 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic apparatus 100 and a user and simultaneously, provide an output interface between the electronic apparatus 100 and the user.

The acoustic output part 152 may output audio data stored in the memory 170 or received from the wireless communication part 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the electronic apparatus 100. For example, the acoustic output part 152 may include at least one of a receiver, a speaker, or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic apparatus 100. An event occurring in the electronic apparatus 100 may be, for example, message reception, a call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform an appropriate control associated with the connected external device.

The memory 170 may store data supporting various functions of the electronic apparatus 100. The memory 170 may store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program may be stored in the memory 170, installed in the electronic apparatus 100, and run by the controller 180 to perform an operation (or function) of the mobile terminal.

The controller 180 may generally control an overall operation of the electronic apparatus 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic apparatus 100.

The power supply 190 may supply power to each component included in the electronic apparatus 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

The electronic apparatus 100 may be in a bar shape but not limited thereto. The electronic apparatus 100 may have various shapes within the scope of not contradicting features of the present disclosure.

In the present disclosure, the electronic apparatus 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic apparatus 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic apparatus 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.)

Figure 2:
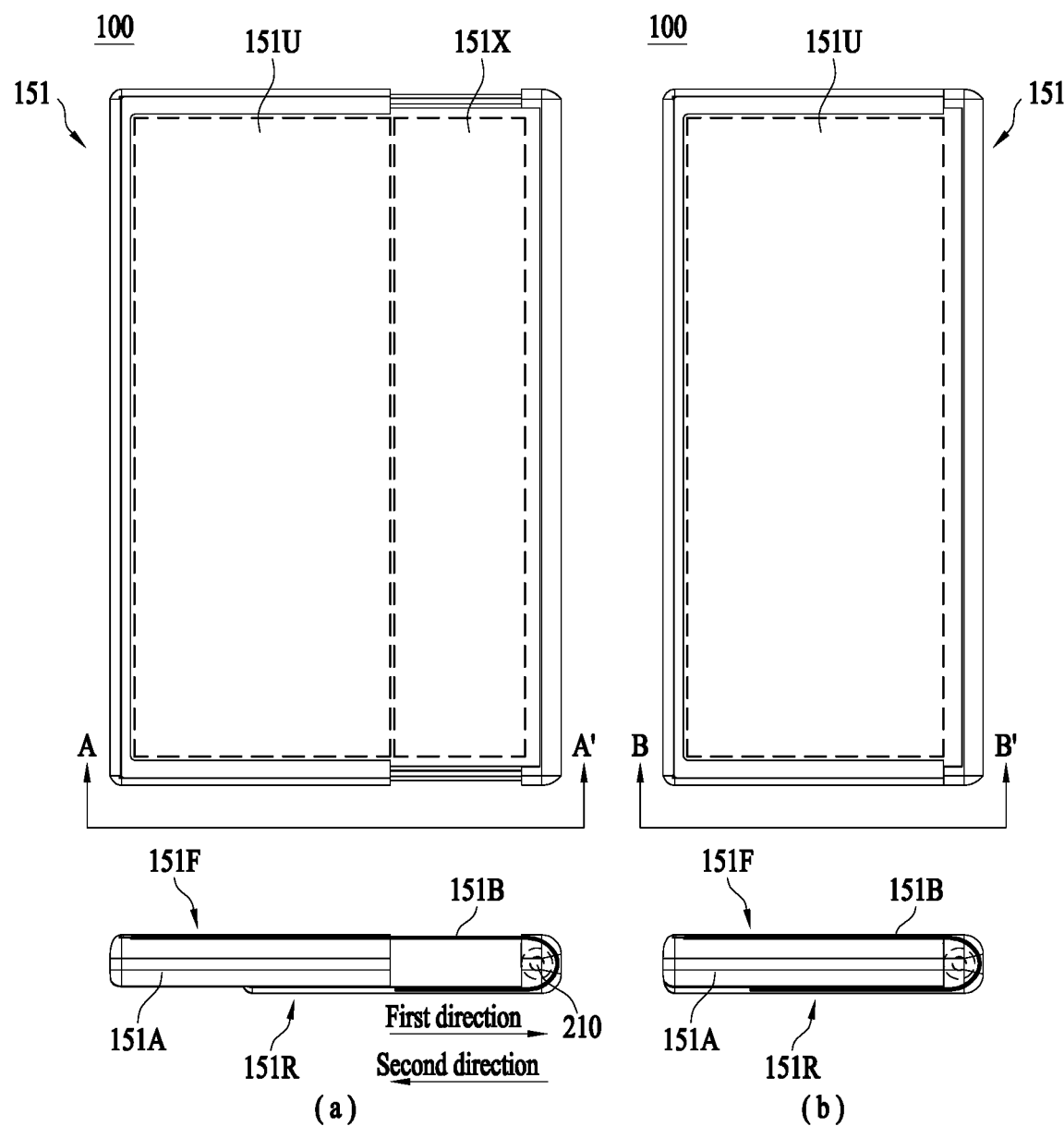
FIGS. 2 and 3 illustrate views obtained before and after an expansion of a display of an electronic apparatus related to the present disclosure.
Figure 3:
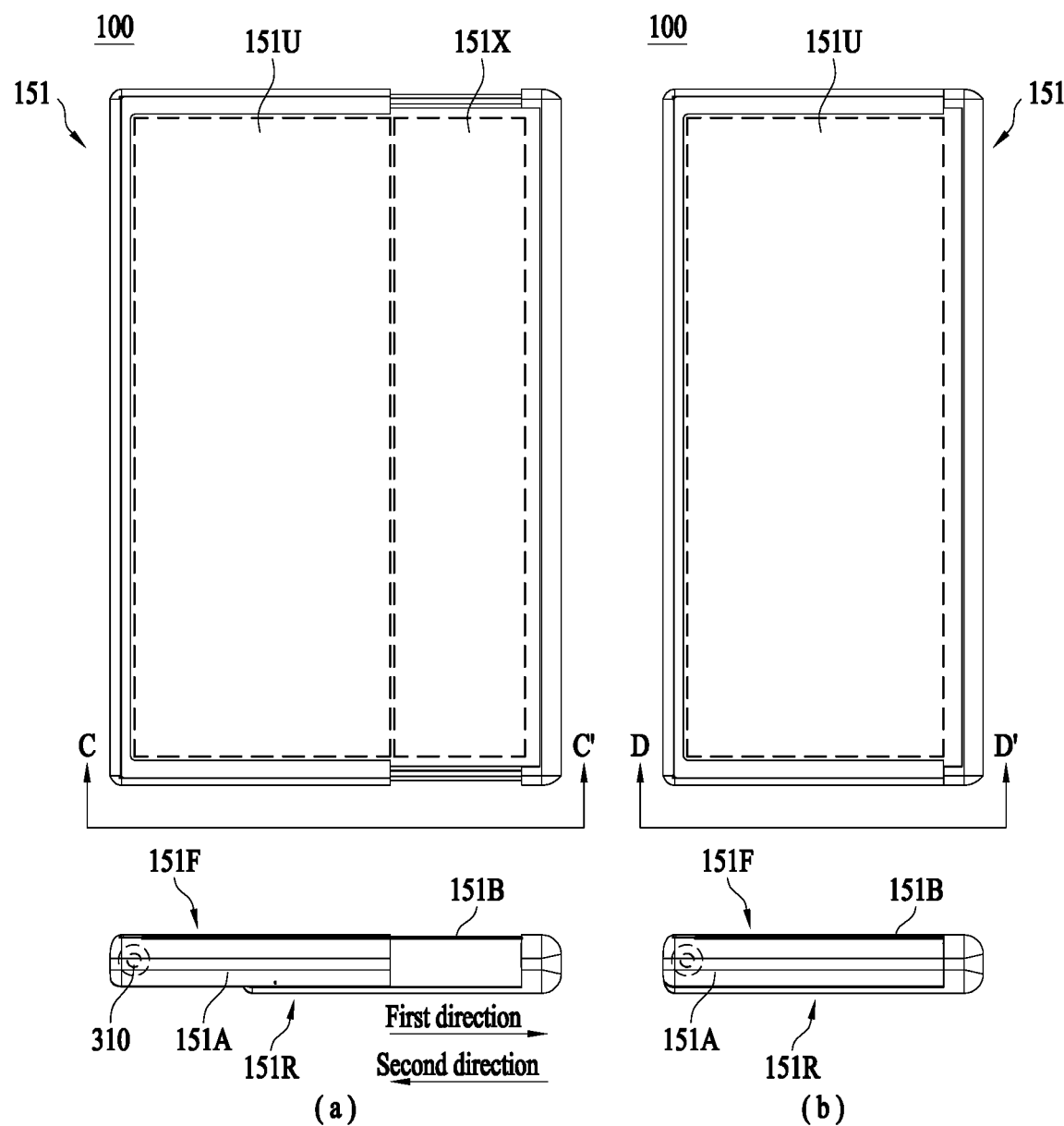

FIGS. 2 and 3 are conceptual diagrams illustrating the states before and after a display 151 of an electronic apparatus 100 related to an embodiment of the present disclosure is extended.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) in FIG. 2 illustrates an electronic apparatus 100 with the display 151 which is extended, and (b) in FIG. 2 illustrates the electronic apparatus 100 with the display 151 which is not extended.

Referring to FIG. 2, the display 151 may have one side fixed at a front surface with reference to the electronic apparatus 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state that the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed at the front surface. When the second frame 151B slidably moves in a direction opposite to the first direction to be retracted toward the first frame 151A, the front region 151F of the display 151 may be reduced as well, causing only the fixed part 151U to remain exposed at the front surface.

The rear region of the display 151 may be exposed at a rear surface of the second frame 151B. The rear region of the display 151 may be covered by a light-transmitting rear window and therefore visible from the outside.

Meanwhile, the front region 151F of the display 151 may be exposed at a front surface without an additional window. In some cases, however, a deco frame may cover a boundary region between the front region 151F and the first frame 151A, thereby preventing an external material and covering a bezel region of the electronic apparatus to help visibility of a screen for a user.

An electronic part may be formed in an inner surface formed by external structures such as the first frame 151A and the second frame 151B. An electronic component for driving the electronic apparatus 100, such as a battery 191, may be mounted at a main Printed Circuit Board (PCB) and thus provided in the electronic part. Alternatively, an electronic component such as an internal antenna module may be mounted directly at the electronic part rather than mounted at the main PCB.

In an embodiment, the electronic apparatus 100 may include a driving part for controlling a size of the display 151. The driving part may be implemented, for example, using a motor. The electronic apparatus 100 may control a size of the display 151 by controlling a moving direction of the first direction edge 210 of the display 151 using a motor.

Specifically, FIG. 3A illustrates an electronic apparatus 100 with a display 151 which is extended, and FIG. 3B illustrates the electronic apparatus 100 with the display 151 which is not extended.

Referring to FIG. 3, the display 151 may have one side fixed at a front region with reference to the electronic apparatus 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain at the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
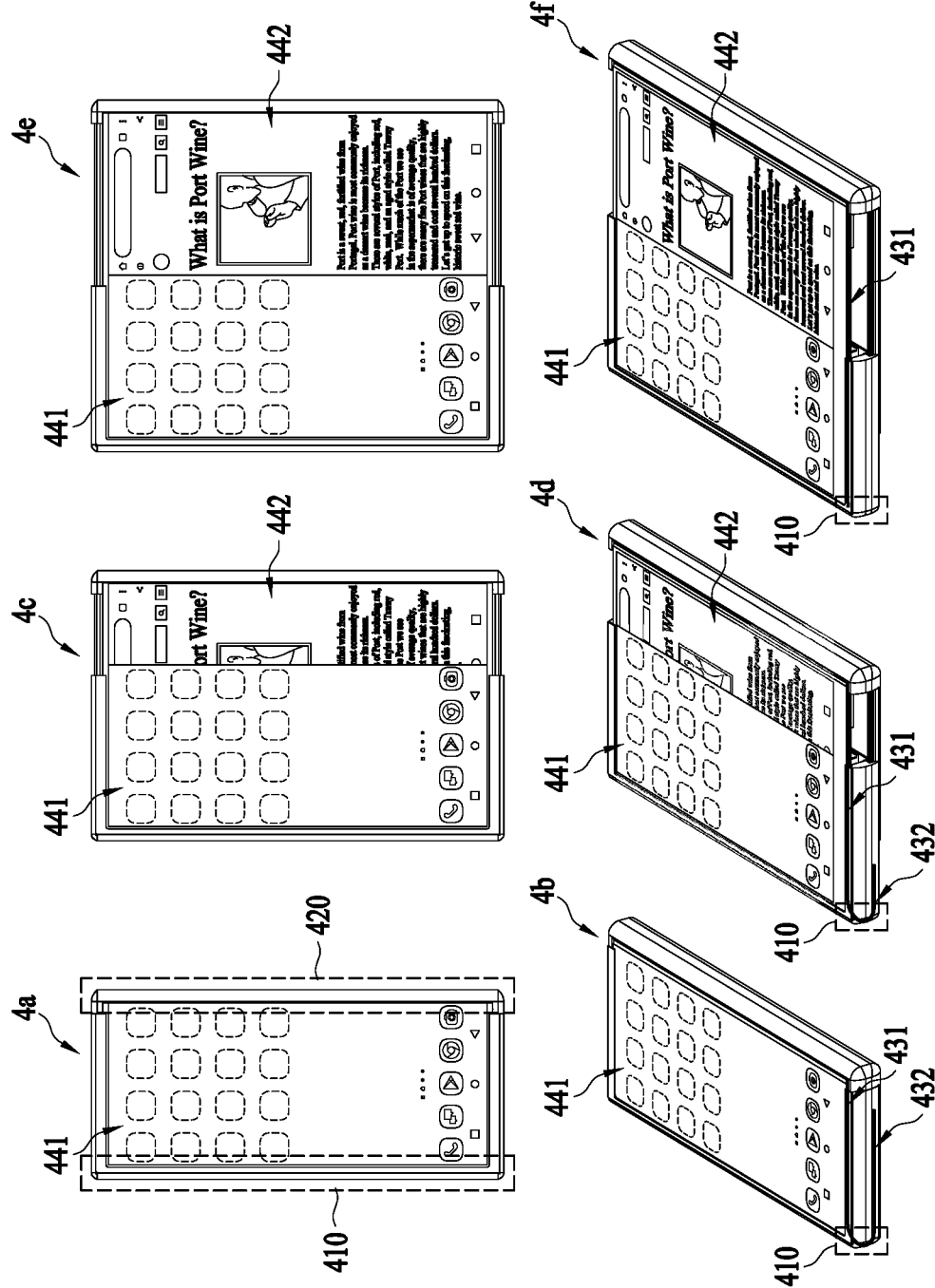
FIG. 4 is a diagram illustrating content provided in an electronic apparatus according to an example embodiment of the present disclosure.

FIG. 4 is a diagram illustrating content provided in an electronic apparatus according to an example embodiment of the present disclosure. Specifically, FIG. 4 illustrates an example of arranging a first area to be closer to one end at which a display is bent than a second area.

Reference numeral 4a represents a case in which a display of an electronic apparatus is unexpanded. The electronic apparatus provides first content in a first area 441. When it is assumed that a size of a display exposed on a first surface (e.g., front surface) of the electronic apparatus is a first size, a size of the first area 441 may correspond to the first size.

As illustrated in the drawings, the first content provided in the first area 441 includes content on a home screen (or content on a home screen application) and is not to be taken as being limited thereto.

In the example embodiment, the display of the electronic apparatus may be bent at one end 410 or another end 420 and located at a first surface (e.g., a front surface) (or first side) 431 and a second surface (e.g., a rear surface) (or second side) 432 of the electronic apparatus. As an example, the display may be bent at the one end 410 in contact with the first surface (e.g., the front surface) of the electronic apparatus, so that a portion of the display is located at the first surface and another portion of the display is located at the second surface. Here, the second surface includes a surface facing the first surface, for example, the rear surface of the electronic apparatus.

As another example, the display may be bent at the other end 420 in contact with the first surface of the electronic apparatus, so that a portion of the display is located at the first surface and another portion of the display is located at the second surface.

Reference numeral 4b represents a layout of content displayed on the first surface 431 in a case in which a display exposed on the first surface 431 is in the first size. As indicated by the reference numeral 4b, the display may be bent at the one end 410 to be located at the first surface 431 and the second surface 432. A size of the display exposed on the first surface 431 may correspond to the size of the first area 441.

The following description may be based on an example in which the display is bent at the one end 410 to be controlled in size but not limited thereto. The present embodiment may also be applicable to a case in which the display is bent at the other end 420.

Reference numeral 4c represents a case in which the display exposed due to display expansion is in a second size, the second size being greater than the first size. In this case, content may be displayed in the first area 441 and a second area 442. Here, the first area 441 may correspond to a predetermined size (e.g., the first size) as indicated by the reference numeral 4a, and the second area 442 may correspond to a degree to which the size of the display is changed.

The provision of the first content may be maintained in the first area 441 as indicated by the reference numeral 4a, and second content may be provided in the second area 442. In the example embodiment, the second content may be designated in advance. At least a portion of the second content provided in the second area 442 may include content corresponding to a size of the second area 442 among the designated second content.

In the example embodiment, the size of the second content may be determined in advance. In such case, at least a portion of the second content, for example, content corresponding to the size of the second area 442 may be provided in the second area 442.

In the example embodiment, at least a portion of the second content provided in the second area 442 may be determined based on at least one of display size change information and a display expansion direction. For example, at least a portion of the second content provided in the second area 442 may include content located in a portion corresponding to the display expansion direction among the designated second content.

Specifically, when the display expansion direction is a first direction, at least a portion of the second content may be determined to be content in a size corresponding to a display size change degree, starting from an end (e.g., a rightmost portion when the first direction is a rightward direction) of the first direction among the second content.

For example, when the display size change degree is an increment of 5 centimeters (cm), at least a portion of the second content may include content included in a range from the end up to 5 cm.

As indicated by reference numeral 4c, since the display expansion direction is a rightward direction, a right portion of the second content may be provided in the second area 442. The entire portion of the second content may correspond to content provided in the second area 442 as indicated by reference numeral 4e.

Reference numeral 4d represents a layout of content displayed on the first surface 431 in a case in which the display exposed to the first surface 431 is in the second size. Referring to reference numeral 4d, the electronic apparatus may reposition the first area 441 on the display such that the first area 441 is closer than the second area 442 to the one end 410 in response to an expansion of the display exposed to the first surface 431. In this case, a user may feel as if the first area 441 remains at the same position irrespective of the expansion of the display.

The reference numeral 4e represents a case in which the display exposed due to the display expansion is in a third size. In the example embodiment, the third size may be greater than the second size, and may be a size of a fully expanded display.

The first area 441 may correspond to a predetermined size as indicated by the reference numeral 4a or 4b. The second area 442 may correspond to an expanded display size. Alternatively, the second area 442 may include a remaining size other than a size corresponding to the first area 441 of the third size.

In the example embodiment, a predetermined size of the second content may be based on a maximum expansion size of the display. For example, the size of the second content may be a size corresponding to a difference between an unexpanded display size and the maximum expansion size. In such case, the second content may be provided in the second area 442 in response to the exposed display having the third size (e.g., the maximum expansion size).

Reference numeral 4f represents a layout of content displayed on the first surface 431 in a case in which the display exposed to the first surface 431 is in the third size. As indicated by the reference numeral 4f, the first content may be provided in the first area 441 and the second content may be provided in the second area 442. The first area 441 may be located closer to the one end 410 than the second area 442.

As described with reference to FIG. 4, irrespective of a change in size of the display exposed on the first surface 431, the first area 441 may be located adjacent to the one end 410 at which the display is bent. Accordingly, the electronic apparatus may minimize a change in the first content provided in the first area 441, thereby providing a stable usability.

Although the drawings illustrate a bending-type display as an example, the present disclosure is not limited thereto, and various size-controllable type displays may be applicable. For example, the display may also be implemented to be wound around the one end 410 or the other end 420.

Figure 5:
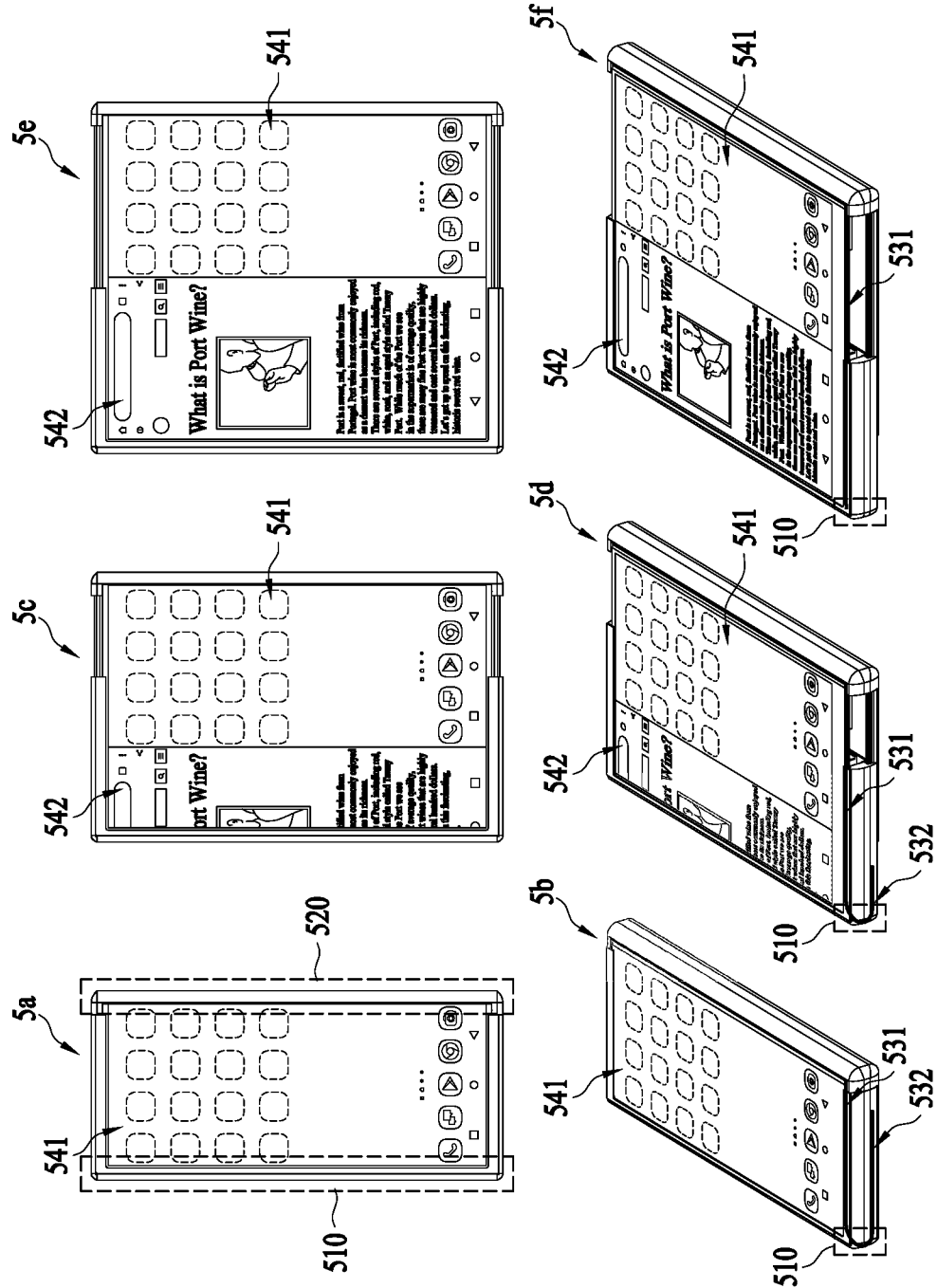
FIG. 5 is a diagram illustrating content provided in an electronic apparatus according to another example embodiment of the present disclosure.

FIG. 5 is a diagram illustrating content provided in an electronic apparatus according to another example embodiment of the present disclosure. Specifically, FIG. 5 illustrates an example of a second area located closer to one end at which a display is bent than a first area. Hereinafter, repeated description of FIG. 4 will be omitted.

Reference numeral 5a represents a case in which a display of an electronic apparatus is unexpanded. The electronic apparatus may provide first content in a first area 541.

The first area 541 may be an area exposed on a first surface (or first side) and correspond to a size of a display exposed to the first surface (hereinafter, a predetermined size). As shown in the drawing, the first content provided in the first area 541 may include a home screen but not be limited thereto.

In the example embodiment, the display may be controlled in size based on one end 510 or another end 520 in the electronic apparatus. For example, the display may be bent at the one end 410 in contact with the first surface (e.g., a front surface) of the electronic apparatus, so that a portion of the display is located at the first surface and another portion of the display is located at a second surface (e.g., a rear surface of the electronic apparatus).

As indicated by reference numeral 5b, the display may be bent at the one end 510 to be located at a first surface 531 and a second surface (or second side) 532. A size of the display exposed on the first surface 531 may correspond to a size of the first area 541.

The following description may be based on an example in which the display is bent at the one end 510 to be controlled in size but not be limited thereto. The present embodiment may also be applicable to a case in which the display is bent at the other end 520.

Reference numeral 5c represents a case in which the display exposed due to display expansion is in a second size. In this case, content may be displayed in the first area 541 and a second area 542. In the example embodiment, the first area 541 may correspond to a predetermined size as indicated by the reference numeral 5a, and the second area 542 may correspond to a degree to which the size of the display is changed.

As illustrated in the drawing, provision of the first content may be maintained in the first area 541 as indicated by the reference numeral 5a. At least a portion of the second content may be provided in the second area 542. In the example embodiment, the second content may be designated in advance. At least a portion of the second content provided in the second area 542 may include content corresponding to a size of the second area 542 among the designated second content.

In the example embodiment, the size of the second content may be determined in advance. In this case, at least a portion of the second content, for example, content corresponding to the size of the second area 542 may be provided in the second area 542.

As indicated by reference numeral 5d, a position of the first area 541 on the display may be maintained in the electronic apparatus when the display exposed to the first surface 531 is expanded. In this case, a user may feel as if the first area 541 moves in response to the expansion of the display.

A size of the first area 541 may be determined in advance. In such case, the second area 542 may include a remaining area other than the first area 541. Also, the second area 542 may be located closer to the one end 510 than the first area 541.

Reference numeral 5e represents a case in which the display exposed due to the display expansion is in a third size. In the example embodiment, the third size may be greater than the second size, and may be a size of a fully expanded display.

In the example embodiment, a predetermined size of the second content may be based on a maximum expansion size of the display. For example, the size of the second content may be a size corresponding to a difference between an unexpanded display size and the maximum expansion size. In such case, the second content may be provided in the second area 542 in response to the exposed display having the third size (e.g., the maximum expansion size).

In the example embodiment, the first area 541 may be consistently provided in a currently exposed portion of the display. Also, the second area 542 may be provided in another portion of the display newly exposed due to a size change.

Reference numeral 5f represents a layout of content displayed on the first surface 531 in a case in which the display exposed to the first surface 531 is in the third size. As indicated by the reference numeral 5f, the first content may be provided in the first area 541 and the second content may be provided in the second area 542. The first area 541 may be located closer to the one end 510 than the second area 542.

When the display is expanded, the electronic apparatus may maintain the first area 541 at a current position and determine a portion of the display newly located on the first surface due to the expansion of the display, to be the second area. Through this, the electronic apparatus may provide the first content in the first area 541 and provide the second content in the second area 542.

In the example embodiment, when the third size includes a maximum expansion size of the display exposed on the first surface, the second area 542 may correspond to a maximum size change degree of the display. The first area 541 may correspond to the size of the display exposed on the first surface before the expansion, which is a predetermined size.

As described with reference to FIG. 5, a position of the first area 541 may be changed based on a change in size of the display exposed on the first surface 531.

In the example embodiment, the display expansion may also be performed in a second direction vertical to the display expansion direction of FIGS. 4 and 5 (hereinafter, the first direction). Even in this case, the example embodiment of the present disclosure may be applicable.

Figure 6:
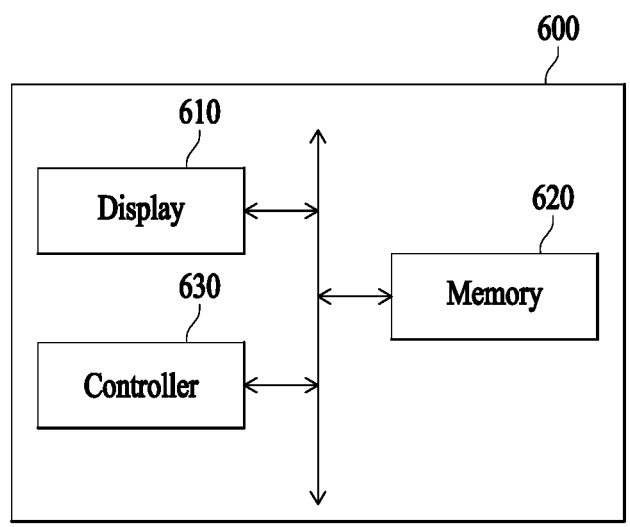
FIG. 6 is a functional block diagram illustrating an electronic apparatus according to an example embodiment of the present disclosure.

FIG. 6 is a functional block diagram illustrating an electronic apparatus according to an example embodiment of the present disclosure.

Referring to FIG. 6, an electronic apparatus 600 may include a display 610, a memory 620, and a controller 630. Each element may be a unit that processes at least one function or operation and may be implemented through hardware, software, or a combination of hardware and software.

The display 610 may be provided such that a size by which the display 610 is exposed on a first surface of the electronic apparatus 600 (e.g., a front surface of the electronic apparatus 600) is changed. The display 610 may be implemented to be flexible.

The display 610 may display a variety of information associated with an operation of the electronic apparatus 600. The variety of information may include, for example, content associated with an application executed in the electronic apparatus 600.

In the example embodiment, a portion of the display 610 may be located at the first surface. Also, another portion of the display 610 may be wound at one surface of the electronic apparatus 600 to be located at a second surface of the electronic apparatus 600. Here, the second surface may include a rear surface of the electronic apparatus facing the first surface.

Specifically, the display 610 may be bent at one end in contact with the first surface, so that at least a portion of the display 610 is located at the first surface and at least another portion of the display 610 is located at the second surface in contact with the one end. Since the related description has been made with reference to FIG. 2 or 3, repeated description is omitted.

The memory 620 may store a variety of information required in the electronic apparatus 600. As an example, the memory 620 may store information on a size of a first area provided in the display 610 or information on a size of a second area provided in the display 610.

As another example, when sizes of the first area and the second area provided based on an input are different, the memory 620 may store information on a relationship between the input and the sizes of the first area and the second area. As another example, the memory 620 may store information on various applications.

The memory 620 may store instructions associated with an operation of the electronic apparatus 600. The electronic apparatus 600 may operate based on the instructions stored in the memory 620. In this regard, a related description will be omitted since it is obvious to those skilled in the art.

The controller 630 may include at least one processor. The controller 630 may be electrically or physically connected to components of the electronic apparatus 600 to control an overall operation of the electronic apparatus 600.

The controller 630 may change a size of the display 610 exposed on the first surface. The controller 630 may provide first content in the first area exposed on the first surface of the display 610 and provide at least a portion of second content in the second area of the display 610 exposed on the first surface based on information on the size of the display 610 exposed on the first surface in response to the size of the display 610 being changed.

A size of the first area may correspond to a predetermined size. A size of the second area may correspond to the change in size (or a size change degree) of the display exposed on the first surface. For example, the predetermined size related to the first area may correspond to a size of the display 610 exposed on the first surface before the display 610 is expanded. The size of the second area may correspond to a size change (or size change amount, or size change degree) of the display 610.

Specifically, when the display exposed on the first surface is expanded by 1 cm, the size of the second area may correspond to a size of a portion of the display 610 increased through the expansion. In this case, at least a portion of the second content provided in the second area may correspond to the size of the second area.

The controller 630 may provide content in the portion located at the first surface of the display 610 based on the size change of the display 610 located at the first surface. In some cases, the controller 630 may omit content provision in a portion of the display 610 located on the second surface. In such cases, the provision of content in the second surface may be omitted, which may lead to a reduction in power consumption. A related example will be described with reference to FIG. 16.

In the example embodiment, the controller 630 may change a position of the first area on the display 610 based on a size change of the display 610 exposed on the first surface. As an example, when the display 610 is expanded in a direction from one end toward another end of the electronic apparatus 600, the first area may be located within a predetermined distance from the one end. As another example, when the display 610 is expanded in a direction from one end toward another end of the electronic apparatus 600, the first area may be located closer to the one end than the second area.

Because a portion of the display 610 located at the one end moves in the expansion direction in response to the expansion of the display 610, the controller 630 may move the first area in a direction facing the expansion direction to correspond to the movement of the display 610. Through this, the position of the first area may be maintained within the predetermined distance from the one end or located closer to the one end than the second area.

In the example embodiment, the controller 630 may maintain the position of the first area on the display 610 based on the size change of the display 610 exposed on the first surface. For example, when the display 610 is expanded in a direction from one end to another end of the electronic apparatus 600, the first area may be maintained at a position within a predetermined distance from the other end. In this example, the second area may be located on the first surface adjacent to the one end.

In the example embodiment, when a size of the second area is less than a predetermined value, the controller 630 may neglect an input received in the second area. The predetermined value may correspond to a size changed when the display 610 is fully expanded. For example, when the display 610 is fully expanded, the size may be 50 square millimeters ($mm^2$). In this example, when the size of the second area is less than 50 $mm^2$, the controller 630 may neglect an input received in the second area.

Size calculation may be performed in various ways. For example, the size calculation may be performed based on a horizontal length of the display 610 or a ratio of the display 610.

When the size is based on the horizontal length, when the predetermined value is 5 cm, and when the horizontal length of the second area is less than 5 cm, the controller 630 may neglect an input received in the second area. When the size is based on the ratio, when the predetermined value is 40%, and when a ratio of a size of the second area to the size of the entire display 610 is less than 40%, the controller 630 may neglect an input received in the second area.

In the example embodiment, the controller 630 may determine the second area based on a size change degree of the display 610 exposed on the first surface. Specifically, the controller 630 may identify the size change degree by identifying a size of the display exposed on the first surface. The controller 630 may determine a size corresponding to the size change degree to be the size of the second area, and provide at least a portion of the second content in the second area.

In the example embodiment, the controller 630 may determine at least a portion of the second content to be provided in the second area, based on at least one of the size (or size change degree) of the second area and the expansion direction of the display 610. As an example, the controller 630 may determine at least a portion of the second content to be provided in the second area, so that the portion has a size corresponding to the size of the second area. In this example, the at least a portion may include at least a portion of the second content previously designated for each size of the second area.

As another example, the controller 630 may determine at least a portion of the second content to be provided in the second area, based on the size of the second area and the expansion direction of the display 610. The controller 630 may determine at least a portion of the second content to be provided in the second area so that the portion includes content located in a part corresponding to the expansion direction among the second content.

More specifically, when the expansion direction of the display is a first direction, the controller 630 may determine at least a portion of the second content such that the portion includes content in a size corresponding to the size change degree of the display based on the second content at an end of the first direction (e.g., a rightmost position if the first direction is a rightward direction).

In the example embodiment, the controller 630 may provide information associated with the first area and the second area in the display 610 exposed on the first surface. Information related to a method of arranging the first area and the second area may be included in the display 610 located at the first surface.

The information associated with the first area and the second area may be provided in various ways. As an example, the information associated with the first area and the second area may be provided by displaying a new window on the display 610. A related example will be described with reference to FIG. 9.

As another example, the information associated with the first area and the second area may be provided by displaying a notification bar on the display 610. A related example will be described with reference to FIG. 14 or 15.

In some cases, the controller 630 may provide the information associated with the first area and the second area in response to a first input being applied. The first input may be a predetermined input mapped with the information associated with the first area and the second area. A related example will be described with reference to FIG. 14 or 15.

In the example embodiment, the controller 630 may determine the first content and the second content based on a second input corresponding to the information associated with the first area and the second area. The second input may include an input of selecting one of selectable icons included in the information associated with the first area and the second area. The controller 630 may determine the first content and the second content based on an icon to which the second input is applied.

In the example embodiment, the information associated with the first area and the second area may include a plurality of selectable icons. For example, the information associated with the first area and the second area may include a first icon through a third icon. In this example, when the first icon is selected, content on a first application may be provided in the first area and the second area. When the second icon is selected, the content on the first application may be provided in the first area and content on a second application may be provided in the second area. When the third icon is selected, the content on the first application may be provided in the first area and content on the second application and a third application may be included in the second area.

At least one of the first application and the second application may be determined in advance. As an example, the first application may include an application associated with a home screen and the second application may include an application used before a first time. As another example, the first application may include an application associated with a home screen and the second application may be determined based on a user input associated with the first application (e.g., an input for selecting a predetermined application).

However, the present embodiment is not limited to the examples. A related example will be also described with reference to FIGS. 9 through 13.

The controller 630 may identify a first input applied on the display 610. The controller 630 may adjust at least one of the size of the first area, the size of the second area, the first content, and the second content based on the identified first input.

As an example, the first input may include an input moving from a first point to a second point on the display. In this case, the controller 630 may adjust the position of each of the first area and the second area in response to the first input. A related example will be described with reference to FIG. 17.

As another example, the first input may include a predetermined form of input. Content to be provided in at least one of the first area and the second area or the positions of the first area and the second area based on the first input may be determined in advance. In this case, the controller 630 may provide the determined content in at least one of the first area and the second area or adjust the positions of the first area and the second area in response to the first input being received. A related example will be described with reference to FIG. 18.

In the example embodiment, the controller 630 may change a layout of the second content based on a size change of the second area. For example, when the second area is in a first size, the second content may be arranged based on a first layout. Also, when the second area is in a second size, the second content may be arranged based on a second layout.

For example, when the second content includes the content on the first application and the content on the second application, the first layout may include a form in which the content on the first application and the content on the second application are arranged left and right. Also, the second layout may include a form in which the content on the first application and the content on the second application are arranged up and down.

Figure 7:
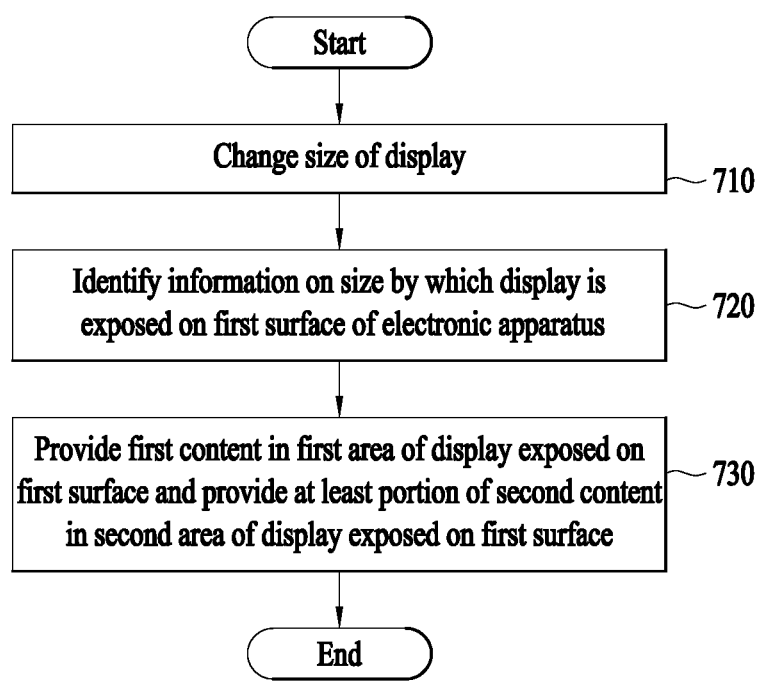
FIG. 7 is a flowchart illustrating a control method of an electronic apparatus according to an example embodiment of the present disclosure.

FIG. 7 is a flowchart illustrating a control method of an electronic apparatus according to an example embodiment of the present disclosure. As would be apparent to one skilled in the art, in some cases, operations of FIG. 7 may be performed in a different order from that shown in the drawing.

Referring to FIG. 7, in operation 710, an electronic apparatus may change a size of a display. In the example embodiment, the electronic apparatus may change the size of the display when an input determined in association with a size change of the display. The determined input may include various types of inputs, and a related example will be described with reference to FIG. 19.

In operation 720, the electronic apparatus may identify information on a size by which a display is exposed on a first surface of the electronic apparatus (hereinafter, also referred to as "first-surface exposed display size") based on a change in the first-surface exposed display size. In response to the size of display being changed, the electronic apparatus may identify information on at least one of the size of the display exposed on the first surface (e.g., a front surface) of the electronic apparatus and a size change degree of the exposed display.

The electronic apparatus may determine a first area and a second area included in the display exposed on the first surface based on the identified information. The first area may include a predetermined size, and the second area may include a size corresponding to a size change degree of the exposed display. In the example embodiment, a sum of a size of the first area and a size of the second area may correspond to the first-surface exposed display size.

In the example embodiment, the electronic apparatus may arrange the first area to be closer to one end (e.g., the one end 410 of FIG. 4) than the second area. The one end may be a portion at which the display is bent and in contact with the second surface (e.g., the rear surface). In this case, a screen may be provided as illustrated in FIG. 4. Alternatively, the electronic apparatus may arrange the second area to be closer to the one end than the first area. In this case, a screen may be provided as illustrated in FIG. 5.

In the example embodiment, the arrangement of the first area and the second area may be determined based on a user selection-based setting. For example, when an input of a user selecting an area to be displayed close to the one end is received, the arrangement of the first area and the second area may be determined based on the received input. However, the present disclosure is not limited to the example. For example, the arrangement of the first area or the second area may also be determined based on a setting at a time of manufacture of the electronic apparatus or a setting of another user.

In the example embodiment, the electronic apparatus may determine the first area and the second area based on a user input. As an example, the electronic apparatus may receive a first input moving from a first position to a second position on the display exposed on the first surface. In this example, the electronic apparatus may divide the display into areas based on the first input, determine one area to be the first area, and determine another area to be the second area. A related description will be described with reference to FIG. 17.

As another example, the electronic apparatus may provide a plurality of selectable icons related to the arrangement of the first area and the second area. When an input for one of the plurality of selectable icons is received, the electronic apparatus may determine the first area and the second area to correspond to an arrangement corresponding to an icon related to the received input.

In operation 730, the electronic apparatus may provide first content in the first area of the display exposed on the first surface and provide at least a portion of second content in the second area of the display exposed on the first surface. Each of the first content and the second content may include a screen for a predetermined application. Based on the first area including a predetermined size, the first content may correspond to a size of the first area. At least a portion of the second content corresponding to a size of the second area may be provided in the second area. In this case, content may be provided appropriately for the second area of which the size is changed based on the first-surface exposed display size.

In the example embodiment, when the size of the second area is less than a predetermined value, the electronic apparatus may neglect an input received in the second area. In this case, an input error that may occur due to a display size change may be prevented.

In some cases, an input may be received in the first area. The input received in the first area may include an input to select content to be provided in the second area. In such cases, the electronic apparatus may change the second content to be provided in the second area based on the input received in the first area. For example, the input received in the first area may include an input of selecting a first application. In this example, the second content to be provided in the second area may be changed to content on the first application. Here, a size and a provision scheme of the changed content may correspond to a provision scheme of the second content.

In the example embodiment, the electronic apparatus may provide content in a portion of the display located at the first surface (e.g., the front surface) and omit provision of content in a portion of the display located at the second surface (e.g., the rear surface) based on a change in the first-surface exposed display size.

In the example embodiment, operations 710 through 730 of FIG. 7 may be performed at a preset time interval. The preset time interval may be shorter than a display expansion completion time. For example, when five seconds are required to complete a display expansion, the preset time interval may be one second. Through this, content may be more effectively provided by reflecting a size changing situation while the display expansion is performed.

Figure 8:
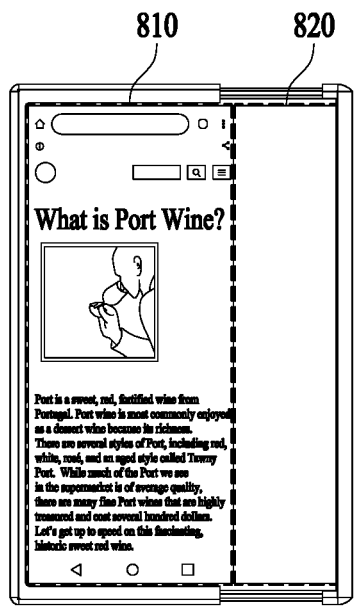
FIG. 8 is a diagram illustrating an example of providing content in a first area of an electronic apparatus according to an example embodiment of the present disclosure.

FIG. 8 is a diagram illustrating an example of providing content in a first area of an electronic apparatus according to an example embodiment of the present disclosure. Specifically, FIG. 8 illustrates an example of a first area and a second area on a first surface of an electronic apparatus.

Referring to FIG. 8, first content may be provided in a first area 810 of a display. A first area may include an area of a predetermined size. A second area may include an area other than the first area of a display exposed on a first surface.

As shown in the drawing, provision of second content may be omitted in the second area 820. The provision of the second content may be performed when a size of the second area 820 is less than a predetermined value but not limited thereto.

FIG. 8 illustrates that first content includes content on a web page (or content on a web application) as an example. However, embodiments are not limited thereto, and various content may be provided.

Although FIG. 8 illustrates that the first area 810 is located closer to a left surface (e.g., one end) of the electronic apparatus than the second area 820 as an example, embodiments are not limited thereto. The second area 820 may also be arranged to be closer to the left surface of the electronic apparatus than the first area 810. The following description is based on a case in which the first area 810 is located closer to the left surface (e.g., one end) of the electronic apparatus than the second area 820 but not limited thereto.

Figure 9:
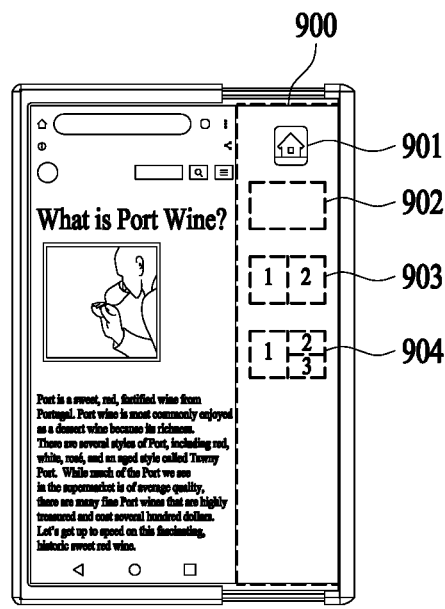
FIG. 9 is a diagram illustrating an example of providing information associated with a first area and a second area in an electronic apparatus according to an example embodiment of the present disclosure.

FIG. 9 is a diagram illustrating an example of providing information associated with a first area and a second area in an electronic apparatus according to an example embodiment of the present disclosure.

Referring to FIG. 9, when a display of a size greater than or equal to a first area is exposed on a first surface in response to a display expansion, an electronic apparatus may determine an area corresponding to a display size change degree to be a second area 900.

The second area 900 may include second content. For example, the second content may include information associated with the first area and the second area 900 (hereinafter, also referred to as "area information"). The area information may include icons related to selection of provided content or an arrangement of the first area and the second area 900.

As shown in the drawing, the area information may include a first icon through a fourth icon. A first icon 901 may include an icon for providing content on a home screen in the second area. The second icon 902 may include an icon for providing content on a first application in the first area and the second area 900. A third icon 903 may include an icon for providing the content on the first application in the first area and providing content on a second application in the second area 900. A fourth icon 904 may include an icon for providing the content on the first application in the first area and providing content on the second application and content on a third application in the second area 900. Since this is merely an example, the present embodiment is not limited to the example.

When an icon is selected from the first icon 901 through the fourth icon 904, content may be provided in the first area and the second area 900 based on the selected icon. A related example will be described with reference to FIGS. 10 through 13.

FIGS. 10 through 13 are diagrams illustrating examples of providing content based on information associated with a first area and a second area in an electronic apparatus according to an example embodiment of the present disclosure.

Figure 10:
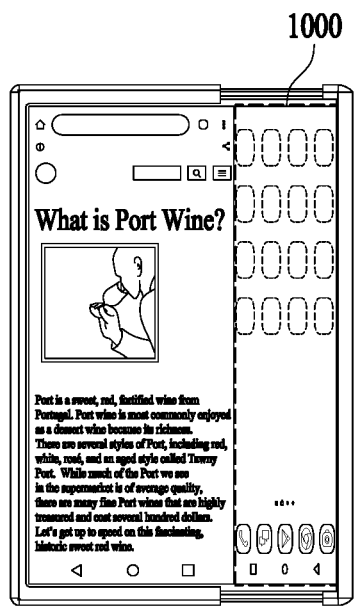
FIGS. 10 through 13 are diagrams illustrating examples of providing content based on information associated with a first area and a second area in an electronic apparatus according to an example embodiment of the present disclosure.

FIG. 10 illustrates a case in which content corresponding to a home screen is provided in a second area 1000 in response to the first icon 901 of FIG. 9 being selected. The content corresponding to the home screen may be based on a home application.

Figure 11:
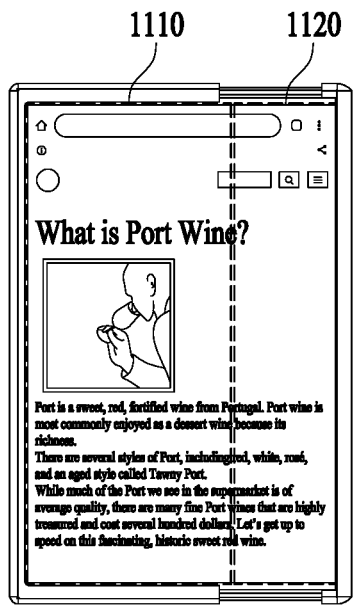

FIG. 11 illustrates a case in which first content and second content include content corresponding to a first application. The first content and the second content may be respectively provided in a first area 1110 and in the second area 1120 in response to the second icon 902 of FIG. 9 being selected. In some cases, the content provided in the first area 1110 and the content provided in the second area 1120 may be associated with the first application and distinguished from each other. Also, as shown in the drawing, content associated with the first application may be included in the first area 1110 and the second area 1120 together.

When the second icon 902 is selected, as shown in the drawing, content corresponding to the first application may be provided to the entire display exposed on the first surface.

In the example embodiment, the content provided in the first area and the second area 1120 may include content on a currently executed application. However, the present embodiment is not limited thereto.

Figure 12:
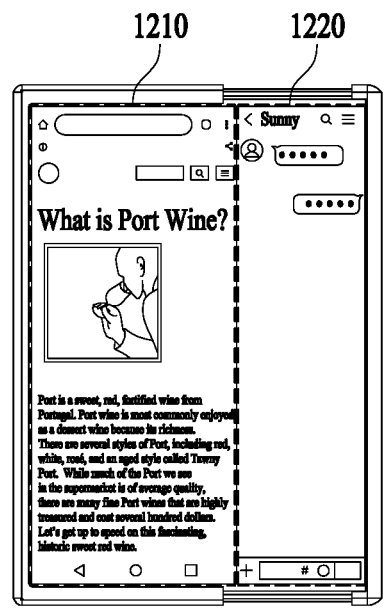

FIG. 12 illustrates a case in which content corresponding to a first application is included in first content provided in a first area 1210 in response to the third icon 903 of FIG. 9 being selected and content corresponding to a second application is included in the second content provided in a second area 1220 in response to the third icon 903 being selected.

In the example embodiment, the first application may include a currently executed application, and the second application may include a previously executed application. However, the present embodiment is not limited thereto.

Figure 13:
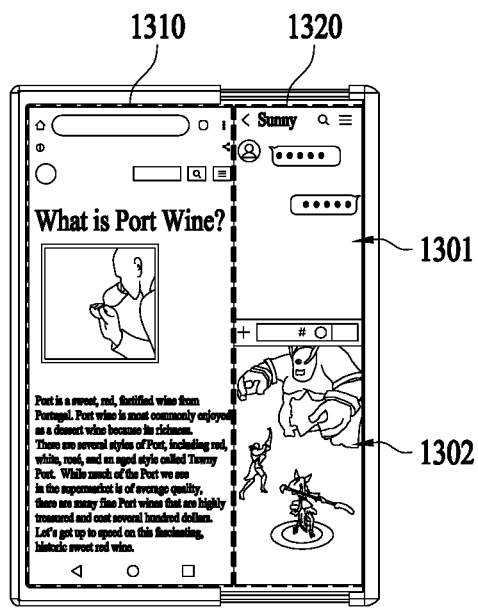

FIG. 13 illustrates a case in which content corresponding to a first application is included in first content provided in a first area 1310 in response to the fourth icon 904 of FIG. 9 being selected and content corresponding to a second application and content corresponding to a third application are included in second content provided in a second area 1320 in response to the fourth icon 904 being selected.

Here, a layout of the second content, the content corresponding to the second application, and the content corresponding to the third application in the second area 1320 may be previously determined but not be limited thereto. For example, the layout of the content corresponding to the second application and the content corresponding to the third application may be determined based on a user input.

In the example embodiment, the first application may include an application on execution, and the second application may include a previously executed application. Also, the third application may include an application executed before a predetermined time. However, the present embodiment is not limited thereto.

When the fourth icon 904 of FIG. 9 is selected, the display may be divided into three areas. Each of the three areas may provide content on a different application. This case may also be as shown in the drawing.

Meanwhile, although the description has been made based on a case in which the first area and the second area of the display exposed on the first surface of the electronic apparatus are screens related to different applications, embodiments are not limited thereto. The present examples may also be applied in various situations in which the first area and the second area are distinguished. For example, different items of content associated with one application may be provided in the first area and the second area.

Figure 14:
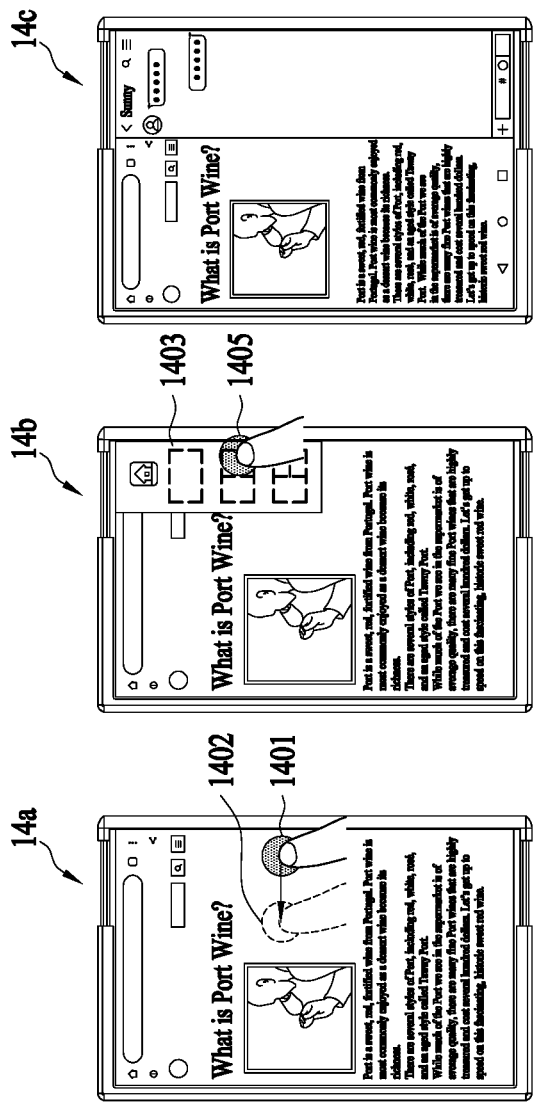
FIG. 14 is a diagram illustrating an example of a control method for displaying content in an electronic apparatus according to an example embodiment of the present disclosure.

FIG. 14 is a diagram illustrating an example of a control method for displaying content in an electronic apparatus according to an example embodiment of the present disclosure. Specifically, FIG. 14 illustrates information on a first area and a second area provided in a form of a notification bar, and a method of displaying content according to provision of the information.

More specifically, FIG. 14 illustrates an example of a method of providing content by separating a display exposed on a first surface into a first area and a second area when the content is provided without distinguishing between the first area and the second area on the entire exposed display.

Reference numeral 14*a* represents a case in which a first input that triggers provision of information associated with the first area and the second area is applied when predetermined content is provided in the entire exposed display. The first input may include, for example, a drag input moving from a first position 1401 to a second position 1402 on the display but not limited thereto.

Information 1403 on the first area and the second area may be provided based on the first input as indicated by reference numeral 14*b*. The information 1403 on the first area and the second area may be provided in at least a portion of a display. When the display is displaying content, the information 1403 may be provided to overlap the content.

However, the present examples are not to be taken as being limited thereto. As described with reference to FIG. 9, the information 1403 on the first area and the second area may also be provided in a separate area.

As indicated by the reference numeral 14*b*, the information 1403 on the first area and the second area may include a plurality of icons associated with content or an arrangement of the first area and the second area. When an input 1405 for selecting one of the plurality of icons is received, the first area and the second area may be arranged on the display based on the selected input and content may be provided to correspond thereto.

In the example embodiment, at least one of sizes of the first area and the second area and content to be provided in the first area and the second area may be designated for each of the plurality of icons. When one of the plurality of icons is selected, a screen of the display may be adjusted based on the selected icon.

For example, as shown in the drawing, the input 1405 of selecting an icon for providing different applications in the first area and the second area may be received. In this example, as indicated by reference numeral 14*c*, the display may be separated into two areas, that is, the first area and the second area, so that content on a different application is provided in each of the areas.

Although FIG. 14 illustrates that content on a currently executed application is provided in the first area and content on a newly executed application is provided in the second area as indicated by the reference numeral 14*c*, embodiments are not limited thereto.

Referring to FIG. 14, a display area arrangement or content provided to the display may be changed after a determination related to the first area and the second area are made. As such, content may be effectively provided in accordance with user's needs, which may improve a usability of the electronic apparatus.

Figure 15:
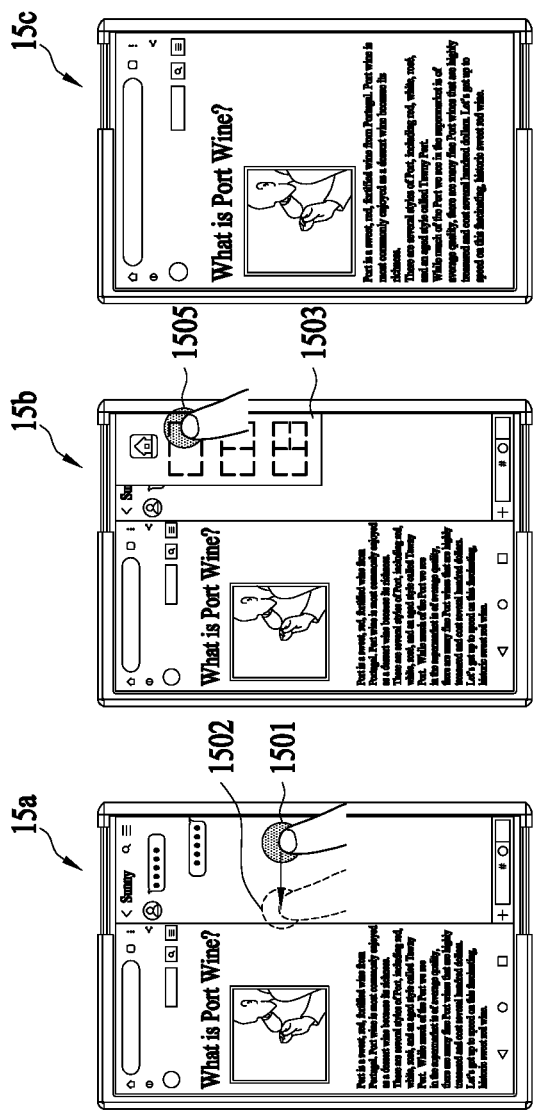
FIG. 15 is a diagram illustrating another example of a control method for displaying content in an electronic apparatus according to an example embodiment of the present disclosure.

FIG. 15 is a diagram illustrating another example of a control method for displaying content in an electronic apparatus according to an example embodiment of the present disclosure. Specifically, FIG. 15 illustrates information on a first area and a second area provided in a form of a notification bar, and a method of displaying content according to provision of the information.

More specifically, FIG. 15 illustrates a method of changing currently displayed content to content on a predetermined application such that the content on the application is provided in the entire display exposed on a first surface of an electronic apparatus. In this case, the currently displayed content may be different types of content provided based on a first area and a second area into which the exposed display is separated. Hereinafter, repeated description of FIG. 14 will be omitted.

Reference numeral 15a represents a case in which a first input that triggers provision of information associated with the first area and the second area of the exposed display is applied when content on different applications is provided in the first area and the second area. The first input may include, for example, a drag input moving from a first position 1501 to a second position 1502 on the display but not limited thereto.

Information 1503 on the first area and the second area may be provided based on the first input as indicated by reference numeral 15b.

For example, as indicated by the reference numeral 15b, an input 1505 for selecting an icon including information on displaying predetermined content related to a predetermined application may be received in the display. In this example, the predetermined content related to the predetermined application may be displayed as indicated by reference numeral 15c.

Figure 16:
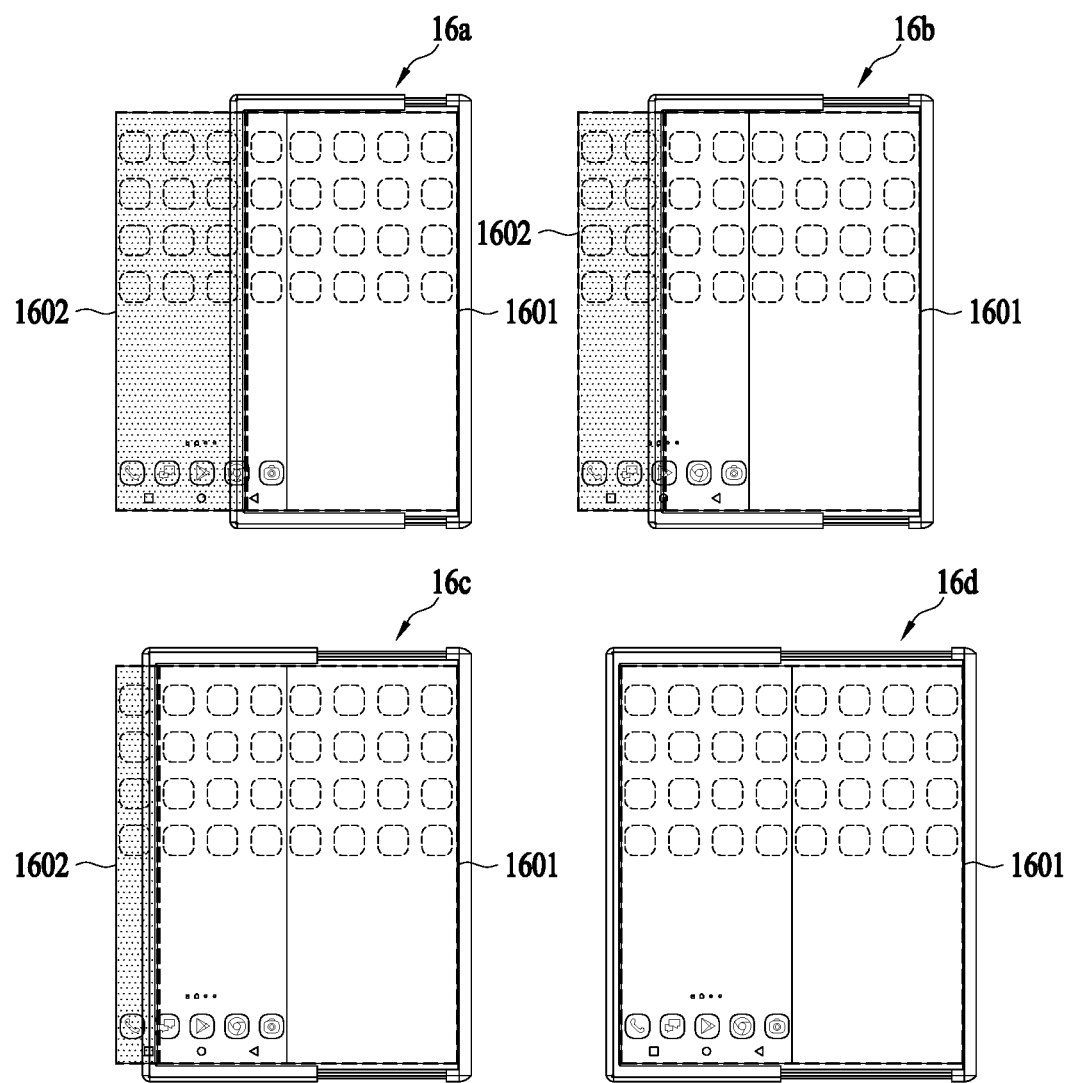
FIG. 16 is a diagram illustrating an example of a display located at a first surface and a second surface of an electronic apparatus according to an example embodiment of the present disclosure.

FIG. 16 is a diagram illustrating an example of a display located at a first surface and a second surface of an electronic apparatus according to an example embodiment of the present disclosure.

Referring to FIG. 16, a display may include a display located at a first surface of an electronic apparatus (hereinafter, referred to as "first-surface display") 1601 and a display located on a second surface of the electronic apparatus (hereinafter, referred to as "second-surface display") 1602. As the display is expanded, a portion located at the first surface may increase and a portion located at the second surface may be reduced.

Reference numeral 16a represents a case in which the first-surface display 1601 is in a first size. Reference numeral 16b represents a case in which the first-surface display 1601 is in a second size. Reference numeral 16c represents a case in which the first-surface display 1601 is in a third size. Reference numeral 16d represents a case in which the first-surface display 1601 is in a fourth size.

The first size may be the smallest among the first size through the fourth size. The fourth size may be the largest among the first size through the fourth size. In other words, a size may increase in an ascending order from the first size to the fourth size.

In such cases, a size of the second-surface display 1602 may be reduced based on the expansion of the display.

In the example embodiment, the electronic apparatus may provide content in the first-surface display 1601 and omit provision of content in the second-surface display 1602. In this case, power consumption may be reduced in the electronic apparatus, which may increase an operational efficiency of the electronic apparatus.

Figure 17:
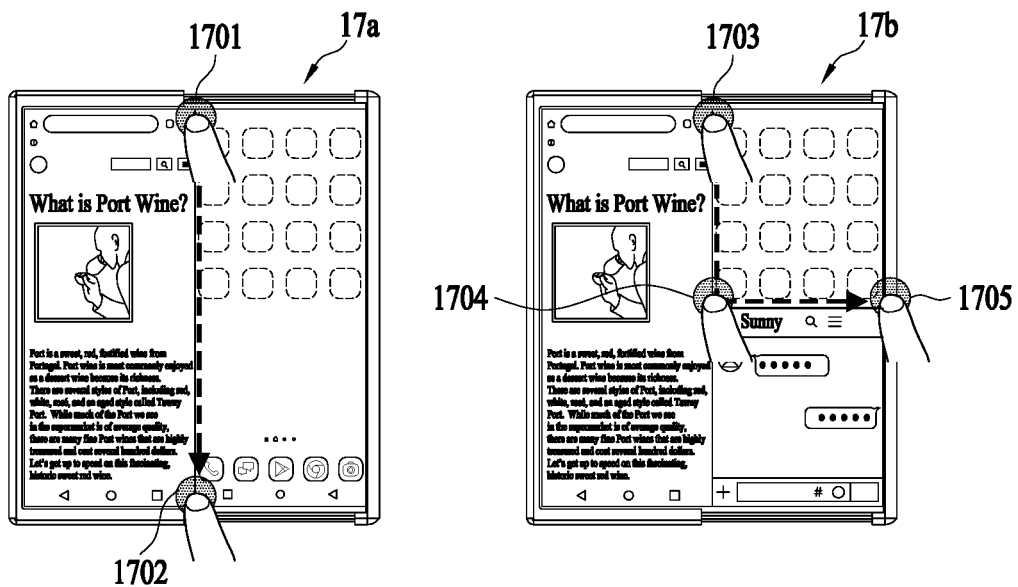
FIG. 17 is a diagram illustrating an example of a method of determining a first area and a second area in an electronic apparatus according to an example embodiment of the present disclosure.

FIG. 17 is a diagram illustrating an example of a method of determining a first area and a second area in an electronic apparatus according to an example embodiment of the present disclosure.

As indicated by reference numeral 17a, a first input moving from a first position 1701 to a second position 1702 may be applied to a display. The electronic apparatus may receive the first input and arrange a first area and a second area based on the received first input as shown in the drawing.

Specifically, based on a line connecting the first position 1701 and the second position 1702, the electronic apparatus may determine a portion (e.g., a right portion) to be the first area and another portion (e.g., a left portion) to be the second area. As such, the first input may be an input to divide a screen of the display.

In some cases, the first input may be mapped with information on first content provided in the first area and second content provided in the second area. In such cases, the electronic apparatus may determine the first area and the second area in response to the first input being received, provide the first content in the first area, and provide the second content in the second area.

In the example embodiment, the electronic apparatus may receive a plurality of inputs to divide the screen. In this case, the screen may be divided based on a line associated with the input (e.g., a line connecting the first position 1701 to the second position 1702). Content to be provided in each of the divided areas may be determined in advance but not be limited thereto. For example, the content to be provided in each of the divided areas may be determined based on an input received in response to a request for a user input corresponding to the division.

As indicated by reference numeral 17b, the electronic apparatus may receive an input of moving from a third position 1703 through a fourth position 1704 to a fifth position 1705. For example, the electronic apparatus may determine one (e.g., the second area) of two areas to include two areas (or to include content associated with each of two applications). In this example, the display may be divided into three different areas as shown in the drawings.

Figure 18:
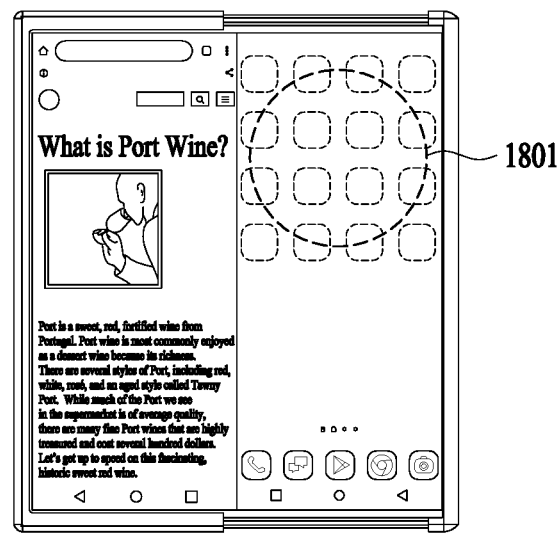
FIG. 18 is a diagram illustrating another example of a method of determining a first area and a second area in an electronic apparatus according to an example embodiment of the present disclosure.

FIG. 18 is a diagram illustrating another example of a method of determining a first area and a second area in an electronic apparatus according to an example embodiment of the present disclosure.

Referring to FIG. 18, when a predetermined input 1801 is applied, a display may be separated into a first area and a second area, so that different content is provided in each of the areas.

In the example embodiment, the first area may include a predetermined size and the second area may include a remaining area other than the predetermined size of a first-surface exposed display size. Alternatively, the first area may include an area of a predetermined size, and the second area may include an area of a size corresponding to a display size change degree.

The predetermined input 1801 may include, for example, an input moving in a circle. However, a type of the predetermined input 1801 is not limited to the example, and various types of inputs may be applicable. For example, the predetermined input 1801 may include a double-tapping input, a long-touch input, or an input of drawing a predetermined figure.

Figure 19:
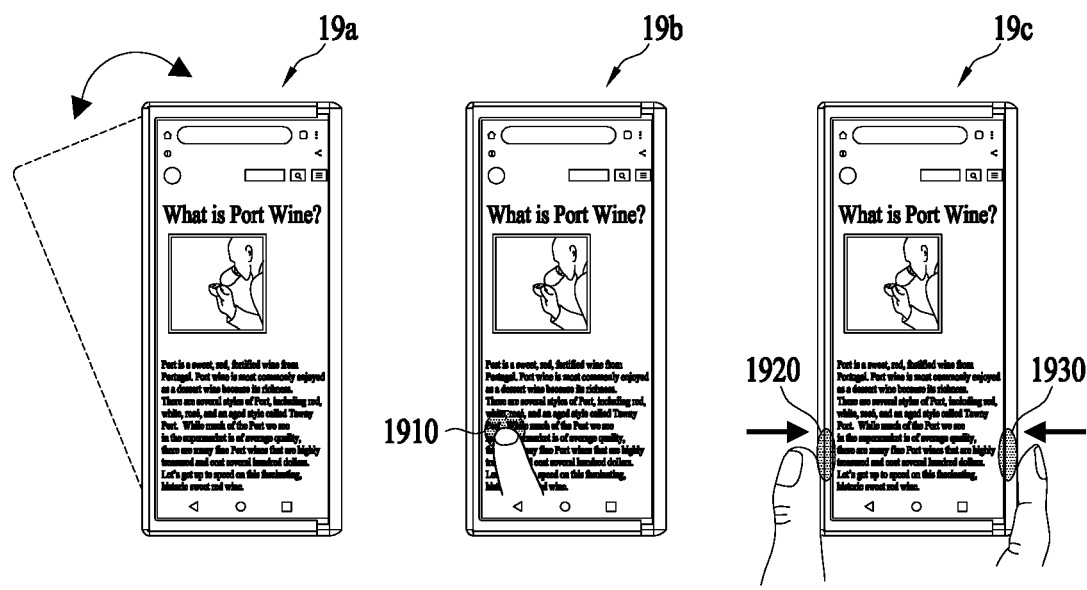
FIG. 19 is a diagram illustrating an example of an input applied to an electronic apparatus according to an example embodiment of the present disclosure.

FIG. 19 is a diagram illustrating an example of an input applied to an electronic apparatus according to an example embodiment of the present disclosure. Specifically, FIG. 19 illustrates an example of an input applied to control a size of a display.

When an input associated with at least one of reference numerals 19a, 19b, and 19c is applied, a size of a display may be controlled.

The reference numeral 19a may include an input of shaking the electronic apparatus. Specifically, a shaking direction (or tilting direction) of the electronic apparatus may be determined based on an expansion direction of the electronic apparatus. As an example, when the electronic apparatus is expanded leftward or rightward, the input of shaking the electronic apparatus may include a gesture of shaking left and right. As another example, when the electronic apparatus is expanded upward or downward, the input of shaking the electronic apparatus may include a gesture of shaking up and down or a gesture of shaking front and back.

The reference numeral 19b may include a touch input to a predetermined position 1910 of a display. The touch input may be selectively implemented as one of various touch inputs. Various touch inputs may include an input of tilting a finger to touch a predetermined area and an input of touching for a predetermined time.

Although not shown, in some cases, the touch input may include inputs to a plurality of positions. The plurality of positions may be determined in advance. In such cases, the size of the display may be controlled based on the inputs being applied to the plurality of positions.

The reference numeral 19c may include inputs to one end 1920 and another end 1930 of the display. For example, the inputs to the one end 1920 and the other end 1930 may include an input of pressing the one end 1920 and the other end 1930 with two fingers such that a predetermined intensity of pressure is applied. For example, the inputs to the one end 1920 and the other end 1930 may include touch inputs applied to the one end 1920 and the other end 1930.

Although FIG. 19 illustrates some examples of the input that triggers an expansion of the display, embodiments are not limited thereto and various applicable inputs may be used.

According to an example embodiment of the present disclosure, an electronic apparatus and a control method of the electronic apparatus may provide content by reflecting a size of a display, so that a user may use the content even while the size of the display is changed.

Also, according to an example embodiment of the present disclosure, an electronic apparatus and a control method of the electronic apparatus may provide content suitable for each of a fixed area (e.g., the first area) and an area (e.g., the second area) corresponding to a change in size of the display while the change proceeds, so that a user may use the electronic apparatus with increased efficiency.

According to example embodiments, it is possible to provide an electronic apparatus for providing content with increased ease and efficiency by reflecting a size of a display, and a control method of the electronic apparatus.

Effects are not limited to the aforementioned effects, and other effects not mentioned will be clearly understood by those skilled in the art from the description of the claims.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. An electronic apparatus comprising:
    a flexible display, wherein at least a portion of the flexible display is located at a first side of the electronic apparatus and a size of the portion of the flexible display exposed at the first side is changeable; and
    a processor configured to control the flexible display to:
        display first content on the portion exposed at the first side; and
        display the first content and second content based on the size of the portion of the flexible display exposed at the first side when the size is changed such that:
            the first content is displayed in a first area of the flexible display exposed at the first side; and
            at least a portion of the second content is displayed in a second area of the flexible display exposed at the first side,
    wherein the first area has a predetermined size,
    wherein a size of the second area is changed according to the changed size of the portion of the flexible display exposed at the first side,
    wherein the processor is further configured to neglect all inputs received on the second area exposed at the first side when the size of the second area is less than a predetermined size, the input received while the at least a portion of the second content is displayed in the second area of the flexible display exposed at the first side, and
    wherein the first content is associated with a first application and the second content is associated with a second application.

2. The electronic apparatus of claim 1, wherein at least a portion of the flexible display is located at a second side of the electronic apparatus, and
    wherein the processor is further configured to control the flexible display to not display any content in the portion of the flexible display located at the second side when the size of the portion of the flexible display exposed at the first side is changed.

3. The electronic apparatus of claim 1, wherein a position of the first area on the flexible display is changed to be closer to one end at which the flexible display is bent than the second area in response to the change of the size of the portion of the flexible display exposed at the first side.

4. The electronic apparatus of claim 1, wherein:
the flexible display is bent at one end in contact with the first side;
at least a first portion of the flexible display is located at the first side;
at least a second portion of the flexible display is located at a second side of the electronic apparatus in contact with the one end; and
a distance between the first area and the one end is less than a distance between the second area and the one end.

5. The electronic apparatus of claim 1, wherein:
the flexible display is bent at one end in contact with the first side;
at least a first portion of the flexible display is located at the first side;
at least a second portion of the flexible display is located at a second side of the electronic apparatus in contact with the one end; and
a distance between the second area and the one end is less than a distance between the first area and the one end.

6. The electronic apparatus of claim 1,
wherein a portion of the second content displayed in the second area corresponds to the size of the second area.

7. The electronic apparatus of claim 1, wherein the processor is further configured to:
control the flexible display to display information associated with the first area and the second area in the portion of the flexible display exposed to the first side in response to a first input received while the first area and the second area are exposed at the first side, wherein the information includes a plurality of icons associated with an arrangement of the first area and the second area; and
determine at least one of the first content or the second content to be displayed in response to a second input received at one of the plurality of the icons,
wherein each of the plurality of icons corresponds to a different arrangement of the first area and the second area, and the arrangement of the first area and the second area comprises information on relation of a location of the first area and a location of the second area exposed on the first side.

8. The electronic apparatus of claim 7, wherein:
the second area includes a third area and a fourth area;
content associated with a third application is displayed in the third area; and
content associated with a fourth application is displayed in the fourth area.

9. The electronic apparatus of claim 1, wherein the processor is further configured to adjust at least one of a size of the first area, a size of the second area, the first content, or the second content in response to an input received on the portion of the flexible display exposed at the first side.

10. The electronic apparatus of claim 9, wherein the received input is associated with dividing the flexible display into the first area and the second area, and comprises moving from a first point to a second point on the flexible display, and
wherein the first area and the second area are repositioned based on a line associated with the moving of the received input.

11. The electronic apparatus of claim 1, wherein the processor is further configured to determine the at least a portion of the second content to be displayed in the second area based on a degree of the change of the size of the portion of the flexible display exposed at the first side.

12. The electronic apparatus of claim 1, wherein a layout of the second content is changed based on a change in a size of the second area when the at least a portion of the second content is displayed in the second area.

13. The electronic apparatus of claim 1, wherein the second application is determined based on time when the second application has been executed previously.

14. The electronic apparatus of claim 1, wherein a position of the second area is located closer to one end at which the flexible display is bent than the first area in response to the change of the size of the portion of the flexible display exposed at the first side.

15. A method for controlling an electronic apparatus, wherein at least a portion of a flexible display of the electronic apparatus is located at a first side of the electronic apparatus and a size of the portion of the flexible display exposed at the first side is changeable, the method comprising:
displaying first content on the portion of the flexible display exposed at the first side; and
displaying the first content and second content based on the size of the portion of the flexible display exposed at the first side when the size is changed such that:
the first content is displayed in a first area of the flexible display exposed at the first side; and
at least a portion of the second content is displayed in a second area of the flexible display exposed at the first side,
wherein the first area has a predetermined size,
wherein a size of the second area is changed according to the changed size of the portion of the flexible display exposed at the first side,
wherein the method further comprises neglecting all inputs received on the second area exposed at the first side when the size of the second area is less than a predetermined size, the input received while the at least a portion of the second content is displayed in the second area of the flexible display exposed at the first side, and wherein the first content is associated with a first application and the second content is associated with a second application.

16. The method of claim 15, wherein at least a portion of the flexible display is located at a second side of the electronic apparatus, and
wherein the displaying the first content and the second content comprises not displaying any content in the portion of the flexible display located at the second side when the size of the portion of the flexible display exposed at the first side is changed.

17. The method of claim 15, wherein a position of the first area on the flexible display is changed to be closer to one end at which the flexible display is bent than the second area in response to the change of the size of the portion of the flexible display exposed at the first side.

18. The method of claim 15, wherein:
the flexible display is bent at one end in contact with the first side;
at least a first portion of the flexible display is located at the first side;
at least a second portion of the flexible display is located at a second side of the electronic apparatus in contact with the one end; and a distance between the first area and the one end is less than a distance between the second area and the one end.

19. The method of claim 15, wherein:
the flexible display is bent at one end in contact with the first side;
at least a first portion of the flexible display is located at the first side;
at least a second portion of the flexible display is located at a second side of the electronic apparatus in contact with the one end; and
a distance between the second area and the one end is less than a distance between the first area and the one end.

20. The method of claim 15, wherein a portion of the second content displayed in the second area corresponds to the size of the second area.

* * * * *